350-96.14 SR CROSS REFERENCE SEARCH ROO
XR 3,476,942
63D
Nov. 4, 1969 HISAYOSHI YANAI ET AL 3,476,942
OPTOELECTRONIC DEVICE HAVING AN INTERPOSED ELECTROMAGNETIC SHIELD
Filed May 9, 1967
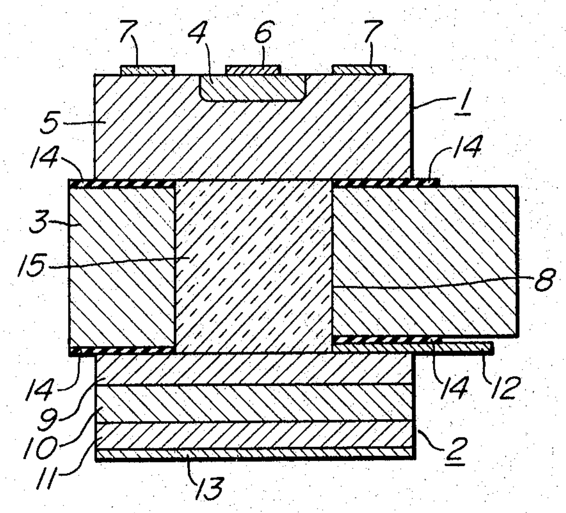
INVENTORS
HISAYOSHI YANAI
HIROSHI KODERA
MASATOSHI MIGITAKA
BY Paul M. Craig, Jr.
ATTORNEY
3476942
OR IN 250/213A United States Patent Office 3,476,942

Patented Nov. 4, 1969

3,476,942
OPTOELECTRONIC DEVICE HAVING AN INTERPOSED-ELECTROMAGNETIC SHIELD

Hisayoshi Yanai, Tokyo, Hiroshi Kodera, Hino-shi, and Masatoshi Migitaka, Kodaira-shi, Japan, assignors to Hitachi, Ltd., Tokyo, Japan, a corporation of Japan Filed May 9, 1967, Ser. No. 637,218
Claims priority, application Japan, May 18, 1966, 41/31,168
Int. Cl. H01j *31/50*
U.S. Cl. 250—213 16 Claims

ABSTRACT OF THE DISCLOSURE

An electroluminescent diode which operatingly emits light in response to an input signal is tightly mechanically and electrically insulatedly connected to a photo diode which operatingly converts the emitted light into an electric signal by an electric conductive material provided therein a light path through which the emitted light from the electroluminescent diode passes to the photo diode, the cutoff wavelength of the light path being designed to be shorter than the wavelength of the input signal but to be longer than the wavelength of the emitted light.

Background of the invention

*Field of the invention.*—The present invention relates to an optoelectronic device comprising a combination of a light emitter and a light detector.

An optoelectronic device is an active device in which an electric signal is transmitted in the form of an optical radiation. Basically, the optoelectronic device is composed of a combination of a light emitter, such as a GaAs electroluminescent diode, and a light detector, such as a Si photodiode.

Minority carriers are injected in accordance with the input signal from a pn junction of a GaAs diode and made to recombine to emit and optical radiation, which is transmitted to and detected by the photodiode, giving rise to a photocurrent. In this way, the whole system is made to perform an active operation, such as amplification of the input signal.

Description of the prior art

Such an optoelectronic device has been known to have the following advantages. The input and output circuits can be completely isolated electrically, because the signal is transmitted by the optical radiation and no common terminal is required for the signal transmission. Henceforth, high frequency characteristics of each of the light emitter and detector can be improved independently, and it is conceivably possible to fabricate an active device of excellent high frequency response. In spite of the aforementioned advantages, the optoelectronic device has been known to have difficulties in achieving good transmission efficiency of the signal, which may be ascribed to the spread of radiation, reflection at the boundary between the light emitter or detector and the medium through which optical radiation is transmitted, and so on.

Recently, various attempts have been made to improve the transmission efficiency; that is, the refractive index of the medium was selected to be close to that of the light emitter or detector, both elements were located in close proximiy so as to reduce the loss due to the spread of the radiation, and so on. On the other hand, the aforementioned attempts resulted in the deterioration of the high frequency performances. Because of the close proximity, a noisy signal is caused in the detector element, which is ascribed to the electric induction from the input circuit. With such induction becoming more pronounced with the increasing frequency, the operation frequency of the system is limited to a relatively lower frequency. If the light emitter and detector are fairly well separated, such a difficulty may be obviated by providing a suitable shield between the emitter and detector.

However, such a system cannot be regarded as a single active element, it has a bad space-factor, and furthermore its transmission efficiency is quite small because of the fairly long distance between the elements. Especially, the high frequency induction is much more conspicuous in the case where a medium of higher refractive index is inserted between the emitter and detector.

For example, the device could be operated only up to 10 mc., while the estimated cutoff frequency was 10 gc. So far, both of the requirements, the high transmission efficiency and high frequency operation could not be satisfied by the conventional technique.

Summary of the invention

An object of the present invention is to provide a novel structure of an optoelectronic device by which both, the transmission efficiency and high frequency characteristics, are improved.

Another object of the present invention is to provide a novel structure of an optoelectronic device by which the deterioration of the high frequency characteristics, such as that which is due to electric induction, is completely eliminated.

The basic idea of the present invention is to insert an electric conductor between the light emitter and detector, the electric conductor having a hole which serves as an optical path between the elements, the dimension of which is selected so as to make the cutoff wavelength shorter than the wavelength of the input signal, and longer than the wavelength of the radiation carrying the signal.

The structure of the present invention can be modified in the following ways.

(1) A material, whose refractive index is close to that of the material constituting the light emitter and/or detector, is used to fill in the optical path to reduce the reflection at the boundary.

(2) Glassy material, such as selenium glass may be used as the aforementioned material.

(3) The glassy material may be used also for the mechanical connection of the emitter and detector.

(4) The electric conductor may be connected to one of the electrodes of one or both of the emitter and detector and may be connected to the outer circuit.

In the following description, the theoretical background of the present invention will be explained and criteria for achieving the advantages of the present invention will be clarified.

Hitherto, it has been well known that a high frequency electromagnetic wave, whose wavelength is of the order of or less than several centimeters, can be transmitted efficiently by a metal tube, known as a waveguide. The waveguide has a cutoff wavelength $\lambda c$ which depends on the shape and size of its cross section, an electromagnetic wave being attenuated if the wavelength is longer than the cutoff wavelength. In the case of the TM mode circular waveguide, the cutoff wavelength is given by the following relation, $$\lambda c = 2\pi a / Y_{mn} \quad (1)$$

where $a$ denotes the radius of the waveguide and $Y_{mn}$ the $n$th root of the $m$th order Bessel function. The electromagnetic wave, having a longer wavelength $\lambda$ than the cutoff wavelength, is attenuated with the attenuation constant $\gamma$, whose amplitude diminishes as $e^{-\gamma l}$ along the distance of transmission $l$, and $\gamma$ is given as $$\gamma^2 = (2\pi/\lambda_c)^2 - (2\pi/\lambda)^2$$
$$= (Y_{mn}/a)^2 - (n\omega/c)^2 \quad (2)$$

In the above equation, $n$ stands for the refractive index of the medium of light transmission, $\omega$ the angular frequency of the electromagnetic wave and $c$ the light velocity. Therefore, the high frequency signal of the angular frequency $\omega$ will be attenuated by selecting the radius $a$ so that $$a<cY_{mn}/n\omega \qquad (3)$$

Although Equation 3 represents the condition of attenuation, it is desirable that the radius is selected so as to satisfy the following inequality, $$\gamma l>1 \qquad (4)$$

where $l$ denotes the length of the optical path in an electric conductor.

The radius $a$ which satisfies Equation 2 is expressed as, $$a=Y_{mn}(\gamma^2+n^2\omega^2/c^2)^{-1/2} \qquad (5)$$

Inequality 4 leads to the condition for the radius $a$ as, $$a<Y_{mn}(1/l^2+n^2\omega^2/c^2)^{-1/2} \qquad (6)$$

If the optical path is filled with a material and its absorption coefficient of light $\alpha$ is not negligibly small, the intensity of light diminishes as $e^{-\alpha l}$ and the length of the optical path should be selected to satisfy the following relation in order for the optical radiation to be transmitted efficiently to the detector, $$\alpha l<1 \qquad (7)$$

Equations 6 and 7 may be used simultaneously to find suitable dimensions of the optical path.

Precautions might be necessary in using the conditions for finding the dimension of the optical path, because the aforementioned theory is valid for the waveguide long enough to neglect the end effect. In order to evade the consideration of the complicated boundary condition at the end of the waveguide, and to be safe in selecting the dimensions, it may be desirable to choose the length-radius ratio as, $$l/2a>1 \qquad (8)$$

This equation is only an auxiliary condition added to the criteria expressed by Equations 3, 6 and 7.

Although the basic idea of the present invention has been explained for the special example of the optical path with circular cross section, similar considerations hold for the optical path with rectangular cross section by applying the theory of rectangular waveguide. In this case the diameter $2a$ in Equation 8 is made to be equal to the length $b$ of the rectangle. The optical path of the present invention should not be restricted to a single hole of the shape of a circle or rectangle, but it may be a multiplicity of circular or rectangular holes or their combination and also a group of holes arranged in the form of a network.

Furthermore, the optical path of the present invention need not be restricted to a straight hole cut in an electric conductor, but it may form a curved path, its inner wall being coated with reflecting material, or the hole being filled with optical fiber in order to transmit the optical signal.

It is easily conceived that the outer diameter of the optical fiber need not fit strictly to the inner diameter of the optical path.

Brief description of the drawing

The present invention will be described in more detail with reference to the attached drawing, in which the sole figure shows the vertical cross section of an optoelectronic device fabricated according to the present invention.

Description of the preferred embodiment

In the figure, reference numeral 1 represents an electroluminescent diode made of a GaAs body having a pn-junction, and 2 represents an Si-pin-photodiode. An electric conductor 3, in which a circular hole 8 is cut for the transmission of optical radiation, is inserted between the light emitter and detector.

The GaAs diode 1 is fabricated with an n-type GaAs base 5 and a p-type region 4 formed by diffusion of Zn into the base 5.

An electrode 6, which is of the shape of a circular disc is connected to the p-region 4 and an electrode 7, a circular ring, is connected to the n-region 5.

The electric conductor is 1 mm. in thickness and has a circular hole of a radius of 0.5 mm., which is filled with Se-As-I glass 15 (the constitution of the glass being 3:2:5 by weight).

This glassy material is liquified at a temperature of 100° C. or lower, so that the emitter and detector diodes can be connected without undergoing any change during the connecting operation.

The silicon pin-photodiode 2 is composed of regions 9, 10 and 11.

The region 9 is a p-type conductivity region which is produced by the selective diffusion of boron into the intrinsic epitaxial layer 10 on the low resistivity n-type silicon substrate 11.

Electrodes 12 and 13 are attached to the p-type region 9 and n-type region 11 respectively. An insulator 14 may be inserted to isolate the electric conductor from the photodiode.

The optical properties of the Se-As-I glass applied in the circular hole was measured at the wavelength 9000 Å., corresponding to the emitted radiation from the GaAs pn-junction. The result was $$\alpha=10 \text{ cm.}^{-1},\ n=2.4$$

The attenuation constant $\gamma$ of a circular optical path with a radius of 0.5 mm. and a length of 1 mm. was estimated and confirmed experimentally, as $$\gamma=20 \text{ cm.}^{-1}$$

Therefore, an input signal of frequency 10 gc. was attenuated by 20 db, and thus direct coupling between the emitter and detector due to high frequency induction was not observed.

As for the transmission of optical radiation, the diameter of the circular hole was quite large as compared with the wavelength of the light, so that attenuation was not appreciable although scattering and absorption may be suspected. The optoelectronic device of the present embodiment was operated with the switching time as short as 0.1 ns. and the signal transmission efficiency as high as 10%. The present embodiment is the first realization of the device which satisfies both the requirements of high frequency performance and high transmission efficiency.

As was explained, the present invention makes it possible to fabricate an optoelectronic device which can be operated at high frequency, with high efficiency and also with the absence of the high frequency induction. Besides the principal advantage aforementioned, the present invention has the following advantages: (1) The light emitter and detector are connected by an electric conductor and a material inserted in the optical path, so that the optoelectronic device according to the present invention is mechanically solid as a whole. (2) The structure and fabrication process may be simplified because at least one of the electrodes of the light emitter and/or detector dcan be substituted by the electric conductor. (3) Heat dissipation can be improved because the generated heat may be dissipated through the electric conductor.

We claim:

1. An optoelectronic device comprising a light emitter which emits optical radiation in accordance with an electric signal; a light detector which receives the radiation from the light emitter and converts the energy of the radiation to an electric current; and an electric conductor inserted between said light emitter and said light detector, an optical path being provided in said electric conductor to transmit the optical radiation from said light emitter to said light detector, the dimension of said optical path being selected so that the cutoff wavelength of the optical path may be shorter than the wavelength of the electric signal and longer than the wavelength of the optical radiation.

2. An optoelectronic device as defined in claim 1, wherein the optical path is filled with a material as a medium of light transmission, the refractive index of which is close to those of the materials used for the fabrication of said light emitter and light detector.

3. An optoelectronic device as defined in claim 1, wherein the electric conductor is electrically conductively connected to at least one of said light emitter and detector to serve as an electrode.

4. An optoelectronic device as defined in claim 1, in which the length of the optical path $l$ is so selected as to satisfy the inequality $\gamma l > 1$ wherein $\gamma$ is an attenuation constant of the optical path at the frequency of the electric signal.

5. An optoelectronic device as defined in claim 1, in which the length of the optical path $l$ is so selected as to satisfy the inequality $\alpha l < 1$ wherein $\alpha$ is the absorption coefficient of light of the material filled in the optical path.

6. An optoelectronic device as defined in claim 1, in which the cross section of said optical path is formed in a circular shape, the length $l$ of said optical path and the radious $a$ of said circular cross section of said optical path being so selected as to satisfy the inequality $l/2a > 1$.

7. An optoelectronic device as defined in claim 1, in which the cross section of said optical path is formed in a rectangular shape, the length $l$ of said optical path and the length $b$ of said rectangle being so selected as to satisfy the inequality $l/b > 1$.

8. An optoelectronic device as defined in claim 2, wherein said medium is a glassy material of low melting point.

9. An optoelectronic device as defined in claim 8, wherein said glassy material of low melting point is a material in which selenium is the main constituent.

10. An optoelectronic device as defined in claim 9, wherein said glass material is composed of Se, As and I.

11. An optoelectronic device as defined in claim 3, wherein the optical path is filled with a material as a medium of light transmission, the refractive index of which is close to those of the materials used for the fabrication of said light emitter and light detector.

12. An optoelectronic device as defined in claim 4, in which the length of the optical path $l$ is so selected as to satisfy the inequality $\alpha l < 1$ wherein $\alpha$ is the absorption coefficient of light of the material filled in the optical path.

13. An optoelectronic device as defined in claim 12, in which the cross section of said optical path is formed in a circular shape, the length $l$ of said optical path and the radius $a$ of said circular cross section of said optical path being so selected as to satisfy the inequality $l/2a > 1$.

14. An optoelectronic device as defined in claim 12, in which the cross section of said optical path is formed in a rectangular shape, the length $l$ of said optical path and the length $b$ of said rectangle being so selected as to satisfy the inequality $l/b > 1$.

15. An optoelectronic device as defined in claim 5, in which the cross section of said optical path is formed in a circular shape, the length $l$ of said optical path and the radius $a$ of said circular cross section of said optical path being so selected as to satisfy the inequality $l/2a > 1$.

16. An optoelectronic device as defined in claim 5, in which the cross section of said optical path is formed in a rectangular shape, the length $l$ of said optical path and the length $b$ of said rectangle being so selected as to satisfy the inequality $l/b > 1$.

References Cited

UNITED STATES PATENTS

| | | | |
|---|---|---|---|
| 3,043,958 | 7/1962 | Diemer. | |
| 3,229,104 | 1/1966 | Rutz | 250—227 X |
| 3,283,207 | 11/1966 | Klein. | |
| 3,284,722 | 11/1966 | Gray | 350—96 X |
| 3,358,146 | 12/1967 | Ing et al. | |

OTHER REFERENCES

Miller, Directional Control in Light-Wave Guidance, Bell System Technical Journal, vol. XLIII, No. 4, part 2, pp. 1727–39.

Kapany and Burke, Fiber Optics IX. Waveguide Effects, Journal of the Optical Society of America, vol. 51, No 10, October 1961, pp. 1067–78.

RALPH G. NILSON, Primary Examiner

C. M. LEEDOM, Assistant Examiner

U.S. Cl. X.R.

250—217, 227; 350—96